United States Patent [19]

Pall

[11] 4,184,966
[45] Jan. 22, 1980

[54] TUBULAR FILTER ELEMENTS WITH IMPROVED SIDE SEAM SEAL

[76] Inventor: David B. Pall, Roslyn Estates, N.Y.

[21] Appl. No.: 837,663

[22] Filed: Sep. 29, 1977

[51] Int. Cl.² .................. B01D 27/06; B01D 29/06
[52] U.S. Cl. .................. 210/493 B; 55/497; 55/521
[58] Field of Search .......... 210/493 R, 493 B, 493 M, 210/493 FR, 493; 55/521, 497; 264/248

[56] References Cited

U.S. PATENT DOCUMENTS

| | | |
|---|---|---|
| 3,116,245 | 12/1963 | McNabb et al. .............. 210/493 |
| 3,127,341 | 3/1964 | Abeles ......................... 210/493 |
| 3,417,551 | 12/1965 | Bonell ......................... 210/493 |
| 3,867,294 | 2/1975 | Pall et al. .................... 210/493 |

Primary Examiner—Frank Sever

[57] ABSTRACT

Tubular filter elements are provided having an improved side seam seal which can be bonded to end caps in a leak-tight manner and can be formed of a thermoplastic material which is the same plastic material as the end caps and/or of the filter elements, improving the bonding of the side seam seal to the end caps and filter elements.

16 Claims, 8 Drawing Figures

TUBULAR FILTER ELEMENTS WITH IMPROVED SIDE SEAM SEAL

Cylindrical filter elements have one or more filter sheets or layers formed in a cylindrical configuration, with the open ends of the cylinder closed off by end caps bonded to the ends of the filter sheets. It is essential that the end caps be bonded securely to all portions of the filter sheets, so as to compel fluid passing between the interior and the exterior of the filter cylinder to proceed by way of the filter sheets. Such cylindrical filter elements can be arranged to accept fluid flow either from the inside out, or from the outside in, but in either case all flow must pass through the filter sheets.

In the manufacture of cylindrical filter elements with ultrafine removal ratings, generally in the range of 5 microns to 0.2 micron or less, it is frequently advantageous to use very thin filter sheets, since a thin sheet presents less resistance to fluid flow than a thick one. Such sheets tend to be fragile, and it is for this reason desirable to reinforce the thin sheet against rupture due to applied pressure in both directions, and against mechanical damage by handling during and after fabrication, by surrounding it with relatively thicker and stronger layers of more open foraminous sheet materials, such as, for example, tough long-fibered papers, including hemp and cotton fiber papers.

In the manufacture of such cylindrical filter elements from one or more sheets of filter material, it is customary to fold the sheet or sheets into the form of a cylinder, either straight or with corrugations, to increase the useful area of filter sheets within a confined space, and then join the opposite ends of the filter sheets in a side seam which is bonded with a bonding agent or adhesive strip or coating between the opposed faces. In forming the seal, usually the two outside surfaces of the ends of the sheets are brought together. One or both of the opposed surfaces is coated with adhesive before the surfaces are brought into contact, and the seal is then formed by application of heat to set the adhesive. A seal is formed in which a layer of adhesive extends from end to end of the seam, and across the seam from the outer surface to the inner surface of the filter sheets, and this layer of adhesive is presented endwise to the filter cap.

When the filter element is in the ultrafine category as described above, and contains coarser protective layers about the fine filtering layers, it is very difficult in practice to obtain a tight seal throughout the two coarse layers which are interposed between the two fine layers at the side seal. This difficulty arises in part because an adhesive of sufficiently low viscosity to penetrate the coarser layers tends to be rapidly drawn away by the finer capilarity of the fine filter sheet. For this reason, such seals tend to be very unreliable, and permit passage of solids through the filter element by edgewise flow through the two interposed coarser layers at the side seal.

The adhesive systems used to bond the end caps to the ends of the side sealed pack usually adhere very well to the filter media layers, since these are porous, and consequently absorb some of the adhesive, forming a good bond. The same is not true in relation to the layer of adhesive of which the side seal is composed, and in many systems there is zero adhesion at this point. Consequently, it frequently happens that a poor seal is formed at the adhesive layer, with the result that a leakage path can be formed under fluid pressure across the filter element, since the adhesive extends from the outer surface to the inner surface of the filter sheet across the seam. The result is a potential bypass route for fluid which does not pass through the filter.

Canadian Pat. No. 742,053 issued Sept. 6, 1966 to David B. Pall and Herbert L. Forman describes a reversed lapped seam side seal, wherein outer surfaces of the adjacent sheet portions are brought together in face-to-face relationship, with a self-sustaining ribbon of bonding agent therebetween bonding the sheet portions together to form a leak-proof seal. However, in this type of seam also the bonding agent extends from end to end of the filter, and from inner surface to outer surface of the filter sheet, and consequently the same bonding problem to the end cap is presented.

A potential leakage path of this sort cannot be tolerated in cylindrical filter elements in which the filter sheet is of a pore size such that the filter can be used in filtering out yeasts or bacteria. The development of such a leakage path in use under high fluid pressure, even if the fluid pressure be extraordinary and well beyond the normal fluid pressure, will result in organisms bypassing the filter, with possibly disastrous consequences. The result is that for ultrafine filter use, it is not always possible to use cylindrical filter elements, particularly when high internal fluid pressures are apt to be encountered.

Pall and Jasaitis U.S. Pat. No. 3,867,294, patented Feb. 18, 1975, provide a cylindrical filter element comprising one or more layers of filter sheet material formed in a substantially cylindrical shape, and having opposite sheet end portions folded over with outer and inner end surfaces in adjacent relation and joined together in a side seam seal wherein portions of the sheet adjacent the sheet ends have one surface in face-to-face closely-abutting contact, extending to the end edges of the sheet, and the next-adjacent portions have the other surface opposite each other, extending beyond the end edges of the end portions of the sheet, and spaced apart by the folded-over abutting sheet ends, the opposed surfaces of the sheet ends and the end edges of the sheet ends defining a space therebetween, with a bonding agent in the space bonding the sheets together at the end edges and the opposed surfaces of the sheet substantially without penetrating the face-to-face end portions of the sheet at the seam to the outer surface of the filter sheet.

Thus, the sheet ends are exposed directly to the sealing adhesive, and since the ends of the fine filter sheet layer are similarly exposed, there is no hindrance to the accomplishment of a reliable seal to the ends of the fine filter sheet, and bypassing through the coarser protective layers cannot occur.

Further, in this side seam seal there is filter sheet material available for bonding to the filter end caps without interference by an end of the bonding agent layer, and although there is a layer of bonding agent at the end cap, it does not extend from the inner surface to the outer surface of the filter sheet material. Consequently, no potential leakage path exists at the end cap, due to the bonding agent holding the side seam seal together.

As the bonding agent, a self-sustaining ribbon of bonding agent can be used, of a thickness chosen to just fill the space between the ends of the filter sheet and the opposed next-adjacent surfaces. Application of heat through conventional means causes the ribbon to soften and melt, and produces a leak-proof bond throughout this space. The ribbon can be the type of resin which solidifies on cooling ("hot melt" adhesive) or it can be of the type which polymerizes on heating, but in either event it must reach a low enough viscosity for a sufficient time to penetrate slightly into the filter medium. As an alternate, a material which solidifies by polymerizing can be applied as a liquid. In either case, the temporary application of a strip of pressure-sensitive tape across each end prevents the molten material from running out, and causes it to harden neatly flush with the ends of the cylinder. The use of a self-sustaining ribbon instead of a coating makes it possible to obtain uniform thickness and width of the bonding agent throughout this space, so that the bonding agent layer is absolutely uniform from end to end of the filter cylinder.

While this side seam seal has proved effective, it is costly to introduce in cylindrical filter elements, because of the number of hand operations that must be performed. Consequently, it cannot be used for cylindrical filter elements that must be marketed at a low cost.

In accordance with the instant invention, a tubular corrugated filter element is provided comprising at least one layer of filter sheet material formed in a substantial tubular shape and having the outer surface of the end portions of the filter sheet in adjacent relation, and joined together in a side seam seal by way of self-supporting channel strip of thermoplastic resinous material folded over the end edges of the filter layer, so that the end edges thereof are embraced by the channel strip, which is then bonded to the abutting outer surfaces of the filter sheet, thereby linking the edges of the sheet together.

In a preferred embodiment the tubular corrugated filter element comprises two layers of filter sheet material formed in a substantially tubular shape and having the inner surface of the end portions of the outer filter sheet and the outer surface of the end portions of the inner filter sheet in adjacent relation, and joined together in a side seam seal by way of an interposed self-supporting bonding channel strip of thermoplastic resinous material folded over the outer end edges of the inner filter sheet, so that the end edges thereof are embraced by the channel strip, the channel strip being bonded to the abutting surfaces of the inner and outer filter sheets, thereby sealing the edges of the two sheets together in a leak-tight seal, and blocking the escape of unfiltered liquid between the edges of the inner filter sheet of the tubular filter element into or out from the space enclosed by the inner filter sheet and preventing bypassing of unfiltered liquid from the upstream to the downstream sides of the filter sheets.

In all embodiments, the sheet ends of the filter sheet or sheets in the filter element are joined together and embraced by a nonporous bonding strip formed in a channel configuration, blocking the escape of unfiltered liquid between the edges of the filter sheet or sheets of the filter element into or out from the space enclosed by the filter sheet or sheets, effectively preventing bypassing of unfiltered liquid from the upstream to the downstream sides of the filter sheet or sheets. All liquid entering or leaving that space must necessarily pass through all the filter sheets, whether one or several.

Further, since the bonding channel strip in this side seam seal is of thermoplastic resinous material, it can be the same plastic material as the end caps and/or of the filter sheets. This makes it possible to integrate the bonding channel strip material with the end cap and side seam seal and/or filter sheet material, forming an integral one-piece filter element. The side seam seal can be formed before bonding of the filter end caps to the open ends of the cylindrical filter element; since the materials are the same, there is no interference by an end of a bonding agent layer with this seal. Consequently, no potential leakage path can exist at the end cap, due to the bonding agent holding the side seam seal together, since the bonding agent in the points where it contacts the end cap material is integrated with the end cap material, forming one unit.

As the bonding channel strip, any self-sustaining channel strip of thermoplastic resinous material, preferably the same thermoplastic material as the end cap material, can be used. Application of heat through conventional means causes the thermoplastic channel strip material to soften and melt, and enter the pores of the filter sheet or sheets with which it is in contact, and produce a leak-tight bond throughout the contact area.

The bonding channel strip can be of the type of resin which solidifies on cooling (hot-melt thermoplastic materials), or it can be of the type which polymerizes on heating, and thereafter becomes nonthermoplastic, although thermoplastic in the initial stage of polymerization at which stage the bond is formed. In either event, the channel strip when molten or softened must reach a low enough viscosity for a sufficient time to penetrate at least slightly into the abutting sheets of filter medium.

The use of a self-sustaining channel strip instead of a coating makes it possible to obtain uniform thickness and width of the bonding strip throughout the seal, so that the seal is absolutely uniform in thickness from end to end of the filter cylinder.

The invention is illustrated in the accompanying drawings, in which.

Figure 5:
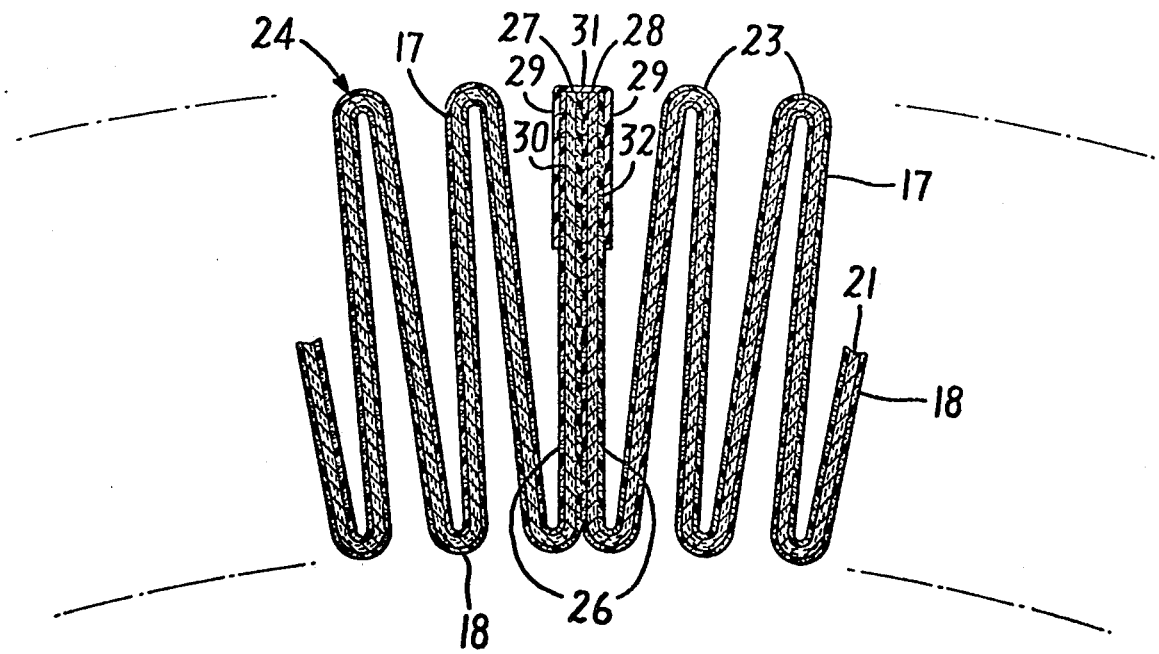
FIG. 5 shows in cross-section a filter element in cylindrical corrugated form, having one filter layer bonded at its edges with a channel strip as the side seam seal in accordance with the invention.
Figure 6:
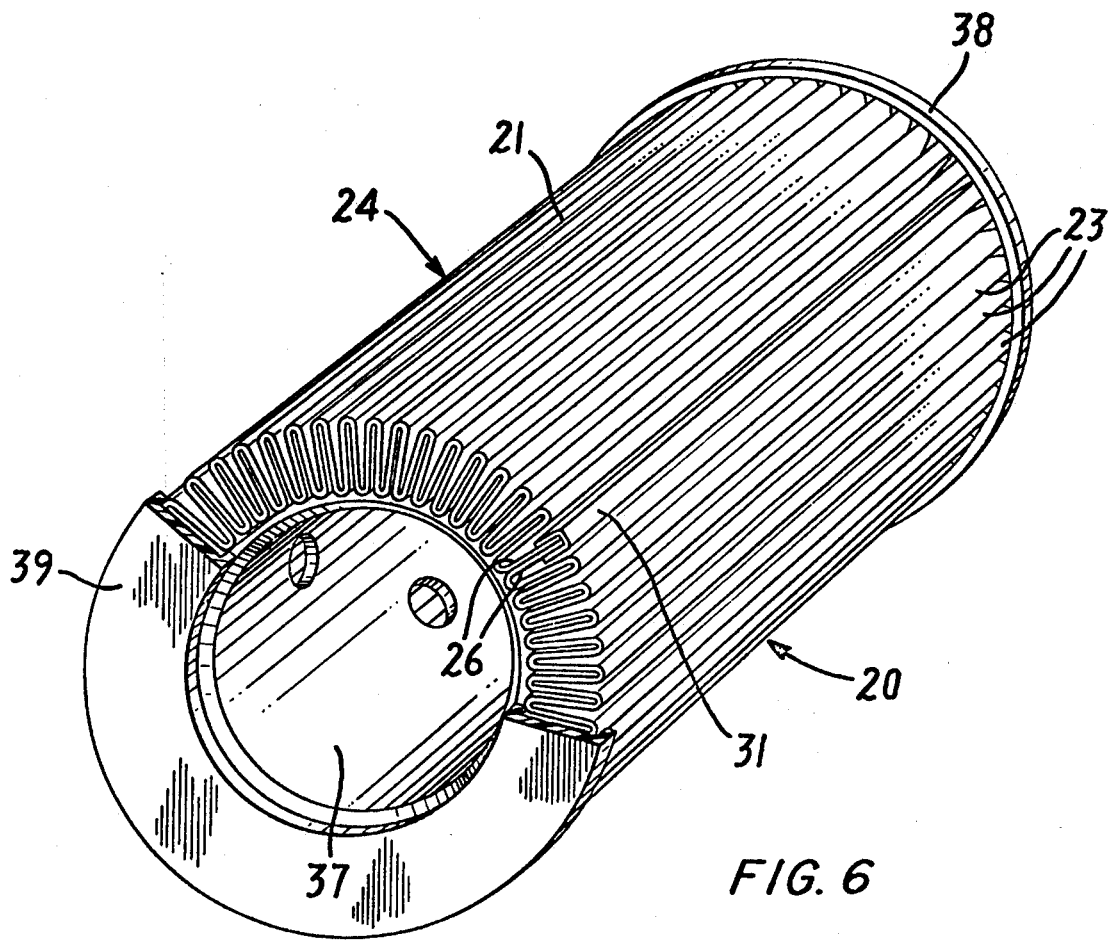
FIG. 6 is a perspective detailed end view of the channel strip side seam seal of the filter element of FIG. 5.
Figure 7:
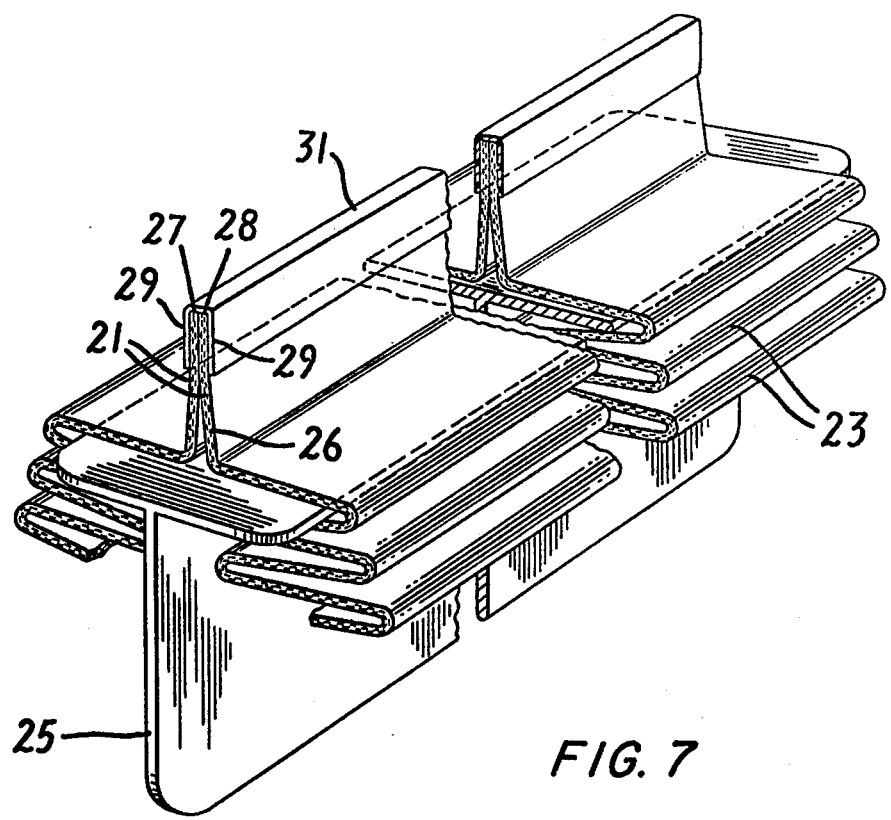
Figure 8:
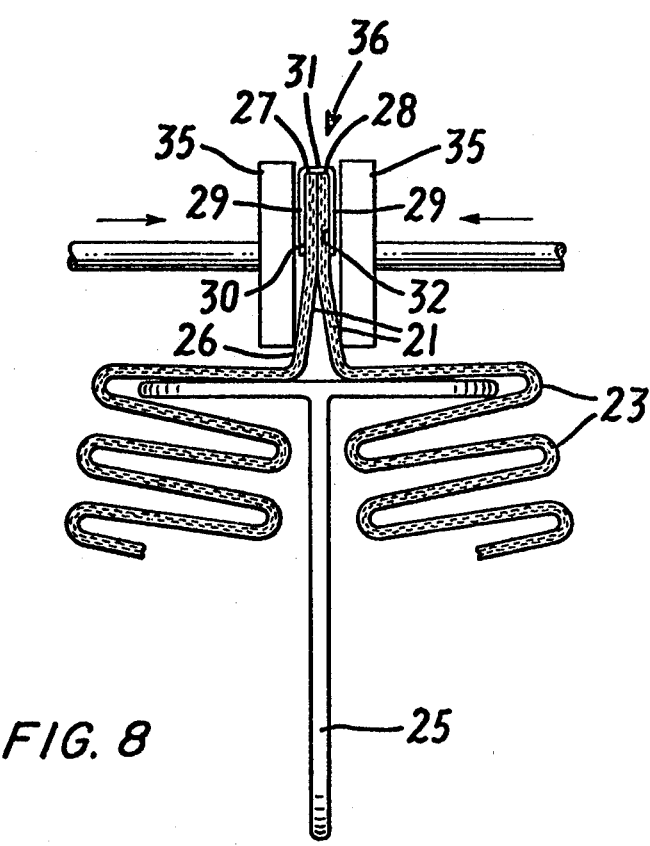

FIG. 7 shows the filter composite in an initial preparatory stage, just prior to forming the side-seam seal, with the bonding channel strip embracing between the outer surface of the ends of the filter layer of the filter element; and FIG. 8 shows the side seam seal being formed in the assembly of FIG. 7 by application of heating platens to the outer surface of the channel strip, the finished filter element after application of end caps being that shown in FIGS. 5 and 6.

The filter elements in accordance with the invention are readily prepared from one or more sheets of filter sheet material by placing the two sheets in close juxtaposition, and corrugating and forming the filter sheet material in the usual way. The only difference in fact from the usual process of manufacture is in the formation of the side seam seal. FIGS. 3 and 4, and 7 and 8 show the steps in the formation of the side seam seal, the finished filter element being obtained subsequent to application of the end caps.

In the dual layer embodiment of the filter element of the invention, as seen in FIGS. 1 to 4, the filter element F comprises two sheets 1, 2 of nonwoven fibrous filter sheet material, in this case of polypropylene fibers. The sheets are in close juxtaposition, with no spacer therebetween, and are sandwiched between inner and outer sheaths 17, 18 of open polypropylene extruded (nonwoven) netting. While the two filter sheets can be of the same porosity, it is generally preferred that the upstream filter sheet be coarser than the downstream filter sheet. In the embodiment shown, the outer upstream sheet 1 has an average pore size of approximately 15 microns, and the inner downstream filter sheet 2 has an average pore size of approximately 2 microns. The two sheets 1,2 of filter material and two sheets 17, 18 of sheath netting after being superimposed in juxtaposition are corrugated in a plurality of corrugations 3, and the ends of the sheets folded over and brought together into a cylinder 4 of the desired length and diameter.

Figure 3:
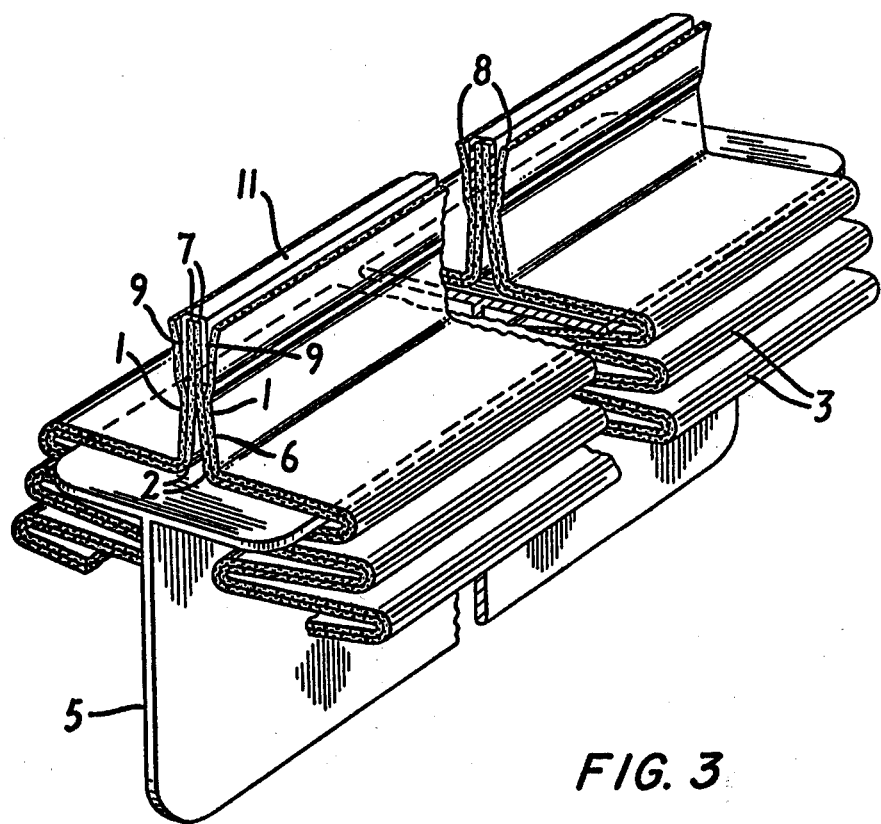
FIG. 3 shows the filter composite in an initial preparatory stage, just prior to forming the side-seam seal, with the bonding channel strip sandwiched between the inner and outer filter layers of the filter element, after spreading apart the ends of the two layers, and inserting the channel strip.

The side seam seal is formed by inserting a T-form support 5 in the last corrugations 6 on each side of the inner sheath 18 before the ends 7, 8 of the inner and outer filter sheets 1,2, opening out the ends of the last corrugations, as seen in FIG. 3, so that the two end portions 7, 8 of the inner and outer sheets are parallel. The two end portions 8 of the outer filter sheet 1 are separated, to the position shown in FIG. 3, while the end portions 7 of the inner sheet 2 remain in abutting relation, and a U-shaped channel strip 11 of polypropylene sheet is inserted over the two ends of the inner layer. The spacing apart of the sides 9 of the polypropylene channel strip is slightly greater than the thickness of the two abutting end portions 7 of the inner filter sheet 2. Accordingly, the outer surfaces F of the two end portions 7 of the inner filter sheet 2 are in juxtaposition to the inner surface 12 of the polypropylene strip 11, and the inner surfaces 13 of the two end portions 8 of the outer filter sheet 1 are in juxtaposition to the outer surface 14 of the polypropylene strip 11. sheet 1 are in juxtaposition of the outer surface 14 of the polypropylene strip 11.

Figure 1:
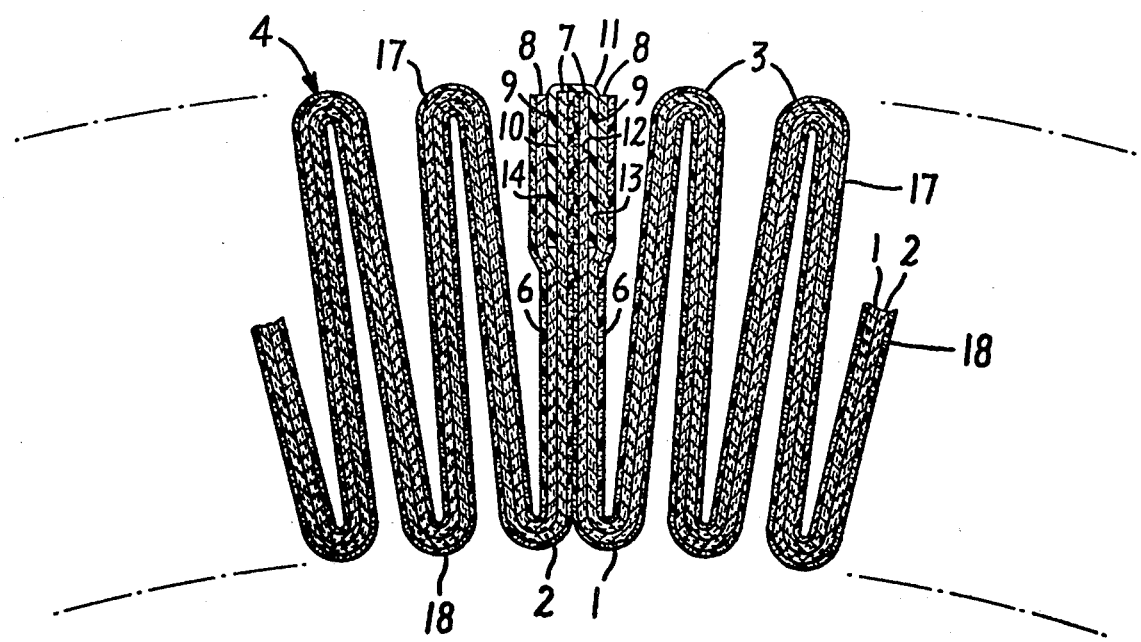
FIG. 1 shows in cross-section a filter element in cylindrical corrugated form, having two filter layers bonded together at their edges with a channel strip as the side seam seal in accordance with the invention.
Figure 2:
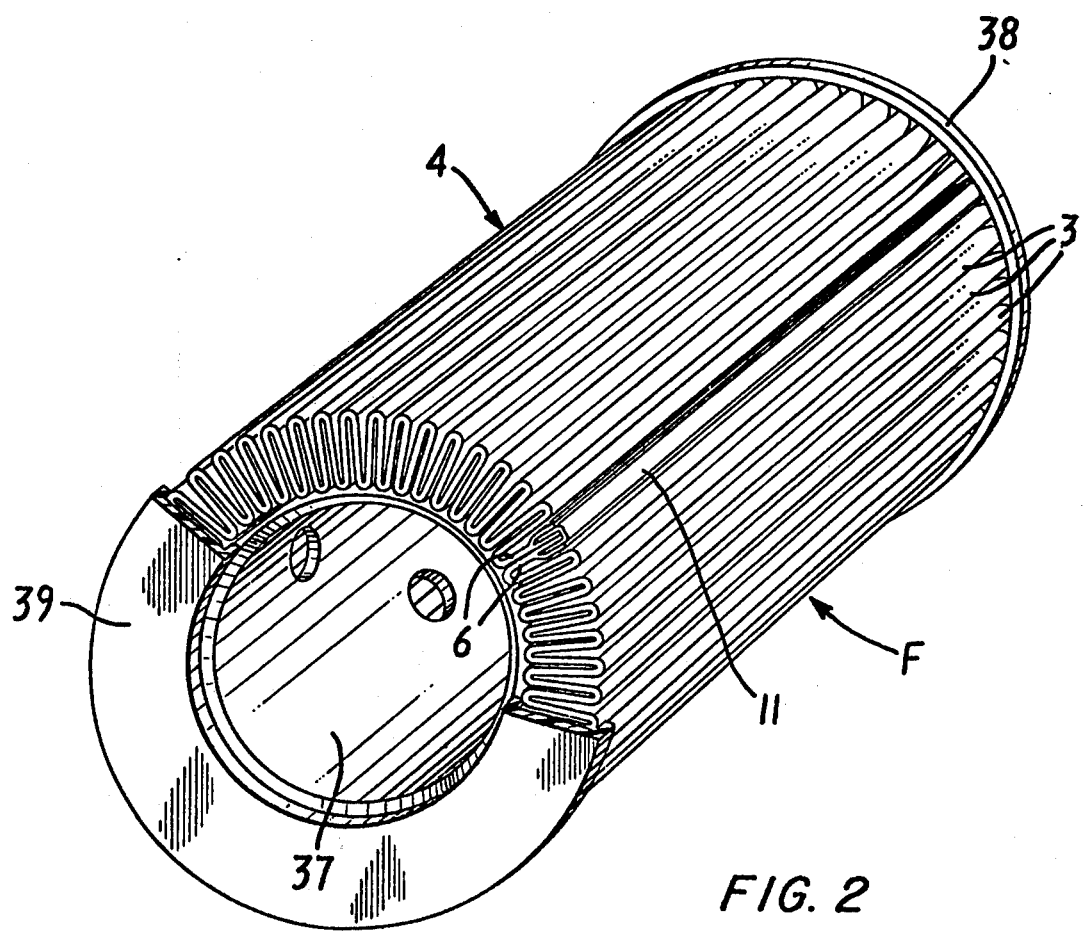
FIG. 2 is a perspective detailed end view of the channel strip side seam seal of the filter element of FIG. 1.

It is apparent from FIGS. 2 and 3 that the polypropylene strip extends from end to end of the filter element.

Figure 4:
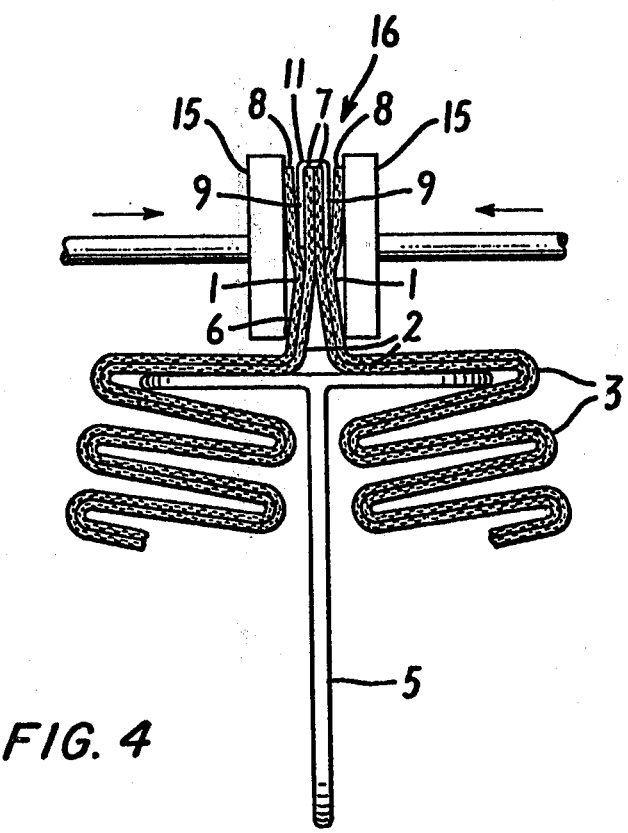
FIG. 4 shows the side seam seal being formed in the assembly of FIG. 3 by application of heating platens to the outer periphery of the outer filter layer at the side seam seal on each side, the finished filter element after application of end caps being that shown in FIGS. 1 and 2.

Each of the inner and outer filter layers is now heat bonded to the polypropylene strip, forming a leak-tight seal. As seen in FIG. 4, the composite seam assembly 16 is placed between the heated jaws or platens 15 of a heat-sealing device of conventional type, and heat and pressure applied to the seam, through the outer filter layer 1 to the channel strip 11 and inner filter layer 2, bringing the inner and outer layers into contact under pressure with the polypropylene strip, and all three components, since they are all of polypropylene, are now softened by the application of heat through the platens. The pressure applied by the platens forces the molten polypropylene material to penetrate the open pores of the filter sheets, forming a liquid-impervious seal, and when the platens are removed and the polypropylene again solidifies, an integrated one-piece side seam seal is formed with the joint of the inner filter layers completely closed off by the base of the channel strip 11.

In the single-layer filter element of the invention, as seen in FIGS. 5 to 8, the filter element 20 comprises one sheet 21 of nonwoven fibrous filter sheet material, in this case of polypropylene fibers, sandwiched between inner and outer sheaths 17, 18 as in FIGS. 1 to 4. The sheet 21 has an average pore size of approximately 5 microns. The sheet and sheath composite is corrugated in a plurality of corrugations 23, and the ends 27, 28 of the composite are folded over and brought together into a cylinder 24 of the desired length and diameter.

The side seam seal is formed by inserting a T-form support 25 in the last corrugations 26 of the filter sheet material before the ends 27, 28, opening out the ends of the last corrugations 26, as seen in FIG. 7, so that the two end portions 27, 28 are parallel. A U-shaped channel strip 31 of polypropylene sheet is inserted over the two ends of the filter sheet 21. The spacing apart of the sides 29 of the polypropylene channel strip is slightly greater than the thickness of the two abutting end portions 27, 28 of the filter sheet 21. Accordingly, the outer surfaces 30 of the two end portions 27,28 of the filter sheet 21 are in juxtaposition to the inner surface 32 of the polypropylene channel strip 31.

It is apparent from FIGS. 6 and 7 that the polypropylene channel strip extends axially from end to end of the filter element.

The filter sheet is now heat bonded to the polypropylene channel strip, forming a leak-tight seal. As seen in FIG. 8, the composite seam assembly 36 is placed between the heated jaws or platens 35 of a heat-sealing device of conventional type, and heat and pressure applied to form the side seam seal through the channel strip 31 to the filter layer 21, bringing the layer into contact under pressure with the polypropylene strip, and both components, since they are all of polypropylene, are now softened by the application of heat through the platens. The pressure applied by the platens forces the molten polypropylene material to penetrate the open pores of the filter sheet, forming a liquid-impervious seal, and when the platens are removed and the polypropylene again solidifies, an integrated one-piece side seam seal is formed with the joint of the filter sheet completely closed off by the U-base of the strip 31.

It is apparent from the drawings that in this type of side seam seal, the seal itself takes up very little of the surface area of the filter, in fact, only a portion equal to the width of the channel strip, since the strip extends outwardly from the filter surface. Accordingly, the side seam seal offers a minimum of obstruction of flow of fluid from the exterior to the interior of the filter cylinder.

After completion of the side seal, the internal core 37 is slipped into the open center of the tube, and the end caps 38, 39 are applied, employing the method of U.S. Pat. No. 3,457,339 to Pall and Jasaitis, patented July 22, 1969. An inside face of the thermoplastic end cap, which is also of polypropylene in the case of the embodiment shown in the drawings, the same material as the bonding strip for the side seam seal, is liquefied to from about 10 to about 90% of the thickness of the end cap to be adhered to the filter cylinder, while cooling the outside face of the thermoplastic end cap to a temperature below its softening point, to maintain the exterior of the end cap in a solid state. All of the edges of one end of the filter material and side seam seal are then embedded in the liquefied face of the end cap, forming a leak-proof seal therewith, and since the plastic material of the side seam seal and filter sheet is the same as the plastic material of the end cap, an integrated unitary filter element structure is formed, upon hardening of the thermoplastic material.

The liquefied thermoplastic material permeates the pores of the ends of the filter material, and when the liquid plastic material has been hardened, the end cap is bonded to the filter with the side seam seal an integral part of the bond. The procedure can then be repeated for capping the other end of the filter element.

The process of the invention is applicable to forming tubular filter elements of any configuration. A side seam seal and an end cap appropriate to the configuration of the tubular filter element is of course employed in each case. Normally, the filter elements are in cylindrical corrugated form, but the process is also applicable to tubular elements in any cross-sectional configuration, including plain, folded, convoluted and corrugated triangular, square, rectangular, elliptical and other polygonal filter tubes. The size and configuration of the convolutions in the case of a corrugated element are not critical, and any thermoplastic resinous material can be employed for the side seam seal and the end caps.

The process of the invention is applicable to tubular filter elements made of from one, two, three, four, five or more layers of the same or different filter materials. If the material has insufficient rigidity to be self-supporting, the tube can be made so by incorporation of a central core or support, such a a spring or a supporting tube of rigid metallic or plastic material, for instance, a perforated metal or plastic foraminous core or spring of conventional construction. External sheath supports can also be applied. Any internal and/or external support is normally of a length substantially equal to that of the filter element, so that the support and the edges of the filter element are in a substantially flush fit with the end caps, when they are bonded thereto. The end caps can be made with appropriate raised or depressed portions and apertures to meet the shape and flow requirements of the ends of the filter support, and the folds are convolutions of the filter tube, and in accordance with the flow requirements and structural requirements of the filter assembly in which the filter element is to be used.

Thus, the process of the invention is applicable to filter elements made of any porous sheet material having pores extending from surface to surface. Two or more layers of the same or varying porosity can be employed in close juxtaposition, or even bonded together, but also spaced apart by suitable spacing sheets. Paper, which can if desired be resin-impregnated (for example, polypropylene), is a preferred filter material. The invention is applicable to papers and like sheet materials formed of any type of fiber including not only cellulose fibers, but also synthetic thermoplastic and nonthermoplastic resin fibers, and fibers of other cellulose derivatives, including for example, fibers of polyvinyl chloride, polyethylene, polypropylene, polyvinylidene chloride, polyamide, polyacrylonitrile, polyester, cellulose acetate, cellulose acetate propionate, viscose rayon, cuprammonium rayon, zein and the alginates, glass, asbestos, potassium titanate, mineral wool, rubber, casein, hemp, jute, linen, cotton, silk, wool, and mohair. Also useful, in addition to papers, are textile fabrics and woven and nonwoven fibrous layers of all kinds, such as felts, mats and bats made of fibrous materials of any of the types listed above.

The filter sheet material of which the filter elements of the invention are made if desired can be impregnated with a synthetic resin or cellulose derivative to increase its strength and resistance to wear by the fluid being filtered. The impregnating agent can be any material useful in the impregnation of papers and textile materials. Such materials are well-known in the paper and textile arts. The impregnating agents can be in liquid form, capable of undergoing solidification as by polymerization, cross-linking, or the like. They can also be in solid form, and applied to the base from a solution in an inert solvent, or as melts. Representative impregnating resins include phenolformaldehyde resins, urea-formaldehyde resins, melamine-formaldehyde resins, polyester resins, and polyepoxide resins.

The process of the invention is particularly applicable to microporous filter elements. Microporous filter elements may be defined as having an average pore size of less than about 5 microns and preferably an average pore size of less than about 0.5 micron. There is no effective lower limit on the pore size of the microprous filter, except that imposed by the excessive pressure required to force water to pass through the filter, at an unduly low rate of flow through, and more rapid plugging. It has been found, in practical applications, that microporous filters having an average pore size as low as 0.02 micron and even lower can be end capped in the invention.

The depth or thickness of the microporous fibrous filter is not critical. A thick filter operates efficiently, but it should not create an undue pressure drop.

A preferred microporous filter is made of a porous base, such as paper, having relatively large pores, within or on the surface of which is deposited particulate material in an amount to diminish the average diameter thereof to less than 1 micron while retaining a voids volume in the microporous portion in excess of 75%, as disclosed in U.S. Pat. No. 3,238,056 to Pall et al. dated Mar. 1, 1966, and U.S. Pat. No. 3,246,767 to Pall et al dated Apr. 19, 1966, the disclosures of which are herein incorporated by reference. The particulate material, which can be in the form, for example, of fibers or fine structured granules, is suspended in a fluid and deposited therefrom upon the surface of the porous base material. The particulate material can all be of the same size and type, or of two or more sizes and types, all suspended in the fluid system. The desired reduction in pore diameter of the base is obtained by varying the size and amount of the particulate material deposited, blending different sizes at different points, if desired. A particularly preferred microporous filter is one of the type described in U.S. Pat. No. 3,246,767 which comprises a porous base having superimposed thereon and adherent thereto a microporous layer comprising a fibrous material of which a proportion of fibers extend outwardly from the porous base at an angle greater than 30°, the microporous layer having an average pore diameter of less than 1 micron and a voids volume of at least 75%. The fiber spacing and angular disposition to the base throughout the entire microporous layer is noted by cross-sectional examination, upon sufficient magnification through an optical or electron microscope. The angular disposition of the fibers is in a large measure responsible for the high voids volume and low pore size characteristic of these microporous filters.

The end caps can be of any desired configuration, appropriate to the requirements of the filter tube and filter assembly. Usually, at least one of the end caps will be provided with an aperture for delivery of filtered fluid from or unfiltered fluid to the interior of the structure. In many instances, both end caps will be apertured, particularly where a plurality of filter elements are to be connected together to form a long tube.

As is well known is the field of plastics, most thermoplastic materials have a wide range of temperatures over which they can be softened. However, it is only after the thermoplastic material is heated to a temperature above its maximum softening point that the material is liquefied.

Accordingly, the bonding channel strip (and also the end caps and/or filter sheet material when they are to be made of thermoplastic material) can be made from any thermoplastic resin that is in or can be brought to a liquid state as by heating to above its maximum softening point. If an ultrafine filter material, i.e., filter material having an average pore size below about 5 microns, is employed, the thermoplastic material employed in the side seam seal and in the end cap, preferably when liquid, has a low viscosity, and preferably less than about 50 cp, to ensure that the resin can penetrate the pores of the filter material and thus form a leak-proof seal.

The bonding channel strip and end cap thermoplastic resin materials can be employed alone or with conventional fillers and/or pigments. Typical resins which can be employed herein, their softening range, and their liquefaction temperature, are set out in the Table below. It is to be understood that the liquefaction temperature of the resins listed hereinafter varies with the molecular weight of the resins, and that the softening range listed for each resin is for the most common form of the particular resin.

and the like can be used herein. The term "thermoplastic" is accordingly used herein to refer both to thermoplastic resins and to resins in a liquid or thermoplastic stage of polymerization further polymerizable to a solid polymer.

As previously indicated, the process is particularly applicable to filter elements in which the U-bonding strip and end caps are made of the same thermoplastic material, which material meets the requirements for end cap and bonding strip materials referred to above. When these components are of the same material, the seal is formed between the end cap and side seam seal is exceptionally strong, and all components of the filter element have the same corrosion resistance and resistance to contamination. A filter element made entirely of one material is resistant to attack to the range of reagents of that material and hence is more widely useful than a filter element having two components, the presence of which greatly expands the range of reagents which are capable of attacking the filter element.

The bonding channel strip can be of a width overall appropriate to the filter sheet material. A rough-surfaced material will be wider than a smooth-surfaced material. Usually, a channel strip of from 0.25 to 5 mm in width will be satisfactory.

The bonding channel strip can have any cross-sectional configuration, including not only U-shapes with rounded web forming the sides of the channel but also squared-off channel shapes such as ⊔ and V shapes, and other polygonal shapes.

A thermoplastic or pressure-sensitive channel strip can be bonded to the juxtaposed sheet surfaces by application of heat and pressure. A thermosetting resin such as the phenol-formaldehyde, urea-formaldehyde and polyepoxide resins can be used in an incompletely polymerized stage wherein they are still thermoplastic or pressure-sensitive, and converted to a thermoset non-thermoplastic stage of polymerization under the application of heat and pressure so as to make a leak-proof seal that is also permanent.

Table

| Name | Softening Point | Liquefaction Point |
|---|---|---|
| Polyethylene | About 221° F. | Above 110° to 115° C. |
| Polypropylene | 285°–320° F. | Above 320° F. |
| Polyisobutylene | | Above 355° F. |
| Polystyrene | 190°–230° F. | Above 230° F. |
| Polyamides (nylon) | 450°–485° F. | Above 485° F. |
| Cellulose acetate | 115°–230° F. | Above 230° F. |
| Ethyl cellulose | 210°–270° F. | Above 270° F. |
| Cellulose acetate butyrate | 140°–250° F. | Above 250° F. |
| Copolymers of vinyl chloride and vinyl acetate | 140°–150° F. | Above 150° F. |
| Polyvinyl chloride | Varies with plasticizer | |
| Polyester | 350°–450° F. | Above 450° F. |
| Polycarbonate (Lexan) | 250°–300° F. | Above 450° F. |
| Polyvinylidene chloride (Saran) | 100°–325° F. | Above 325° F. |
| Vinylidene chloride-vinyl chloride (90-10) copolymer (Saran) | 230°–280° F. | Above 280° F. |
| Polyvinyl butyral | 140°–158° F. | Above 158° F. |
| Polytrifluorochloroethylene (Kel-F) | 346° to 570° F. depending on molecular weight | Depends on molecular weight |
| Polymethyl methacrylate | 140°–230° F. | Above 230° F. |
| Synthetic rubbers such as hard rubber | 150°–190° F. | Above 190° F. |

In addition to the above materials, other thermoplastic materials such as lignin-sulfonate resins, terpene resins, In the case in which the sheet filter material is impregnated with an impregnating resin for greater strength, and the resin is in an incomplete stage of polymerization, the curing of the resin impregnant and of the resin strip can be effected simultaneously. The filter material also can be given an oven or like heat treatment after formation of the side seam seal, to complete the cure of any impregnant and of the bonding channel strip.

Having regard to the foregoing disclosure, the following is claimed as the inventive and patentable embodiments thereof:

1. A tubular corrugated filter element comprising two layers of filter sheet material formed in a substantially tubular shape and having the inner surface of the end portions of the outer filter sheet and the outer surface of the end portions of the inner filter sheet in adjacent relation, and joined together in a side seam seal by way of an interposed self-supporting bonding channel strip of thermoplastic resinous material folded over the outer end edges of the inner filter sheet, so that the end edges thereof are embraced by the channel strip, the channel strip being bonded to the abutting surfaces of the inner and outer filter sheets, thereby sealing the edges of the two sheets together in a leak-tight seal, and blocking the escape of unfiltered liquid between the edges of the inner filter sheet of the tubular filter element into or out from the space enclosed by the inner filter sheet and preventing bypassing of unfiltered liquid from the upstream to the downstream sides of the filter sheets.

2. A tubular filter element according to claim 1 having end caps closing off the ends of the tubular element, and bonded to the ends in a leak-tight seal.

3. A tubular filter element according to claim 2 in which the bonding channel strip in the side seam seal is of the same thermoplastic resinous material as the end caps, and the bonding strip material is integrated with the end caps in the side seam seal, forming an integral one-piece filter element.

4. A tubular filter element according to claim 2 in which the bonding channel strip in the side seam seal is of the same thermoplastic resinous material as the filter sheets, and the bonding strip material is integrated with the filter sheets in the side seam seal, forming an integral one-piece filter element.

5. A tubular filter element according to claim 2 in which the bonding channel strip in the side seam seal is of the same thermoplastic resinous material as the end caps and the filter sheets, and the bonding strip material is integrated with the end caps and the filter sheet material in the side seam seal, forming an integral one-piece filter element.

6. A tubular filter element according to claim 2 wherein the end caps are bonded to the ends of the tubular element by a synthetic resin which impregnates the filter sheet material at such ends.

7. A tubular filter element according to claim 2 in which the end caps and bonding channel strip each comprise polypropylene.

8. A tubular filter element according to claim 2 in which the filter sheets and bonding channel strip each comprise polypropylene.

9. A tubular filter element according to claim 2 in which the end caps, bonding channel strip and filter sheets each comprise polypropylene.

10. A tubular filter element according to claim 1 in which the bonding channel strip is of heat-softenable thermoplastic material.

11. A tubular filter element according to claim 1 in which the bonding channel strip is of an initially thermoplastic material polymerized to a nonthermoplastic stage of polymerization.

12. A tubular filter element according to claim 1 in which the bonding channel strip has penetrated at least slightly into the pores of the abutting of filter sheets in the side seam seal.

13. A tubular filter element according to claim 1 wherein the filter sheet material is a paper.

14. A tubular filter element according to claim 1 in which the sheet material is folded in a corrugated configuration.

15. A tubular filter element according to claim 1 in which the inner filter sheet is of fine porosity, and the outer filter sheet is of coarse porosity.

16. A tubular filter element according to claim 1 in which the outer filter sheet is of fine porosity, and the inner filter sheet is of coarse porosity.

* * * * *

UNITED STATES PATENT AND TRADEMARK OFFICE
CERTIFICATE OF CORRECTION

PATENT NO. : 4,184,966
DATED : January 22, 1980
INVENTOR(S) : David B. Pall

It is certified that error appears in the above—identified patent and that said Letters Patent are hereby corrected as shown below:

Column 1, line 54 : "capilarity" should be --capillarity--.
Column 5, line 51 : "sheet 1 are in juxtaposition of the outer surface 14 of the polypropylene strip 11" should be deleted.
Column 9, line 12 : "is" should be --in--

Signed and Sealed this

Tenth Day of June 1980

[SEAL]

Attest:

SIDNEY A. DIAMOND

Attesting Officer

Commissioner of Patents and Trademarks